United States Patent
Kikuchi et al.

(10) Patent No.: US 7,350,038 B2
(45) Date of Patent: Mar. 25, 2008

(54) DISK SYSTEM AND MEDIUM WITH CONTENTS PLAY-BACK RESTRICTION MECHANISM

(75) Inventors: Yoshihide Kikuchi, Tokyo (JP); Koichi Funaya, Tokyo (JP); Osamu Ootsuka, Tokyo (JP); Kantarou Oota, Tokyo (JP); Naoki Soeda, Tokyo (JP)

(73) Assignee: TDK Corporation, Tokyo (JP)

( * ) Notice: Subject to any disclaimer, the term of this patent is extended or adjusted under 35 U.S.C. 154(b) by 452 days.

(21) Appl. No.: 10/849,118

(22) Filed: May 20, 2004

(65) Prior Publication Data

US 2004/0215874 A1   Oct. 28, 2004

Related U.S. Application Data

(63) Continuation of application No. 09/911,710, filed on Jul. 25, 2001, now abandoned.

(30) Foreign Application Priority Data

Jul. 27, 2000 (JP) ............................ 2000-227691
Oct. 2, 2000 (JP) ............................ 2000-301766

(51) Int. Cl.
  *G06F 12/00* (2006.01)
(52) U.S. Cl. ................... 711/154; 711/100; 711/112; 713/300; 713/340; 713/400
(58) Field of Classification Search .................. None
  See application file for complete search history.

(56) References Cited

U.S. PATENT DOCUMENTS

| 5,218,638 | A * | 6/1993 | Matsumoto et al. ........ 380/228 |
| 6,256,509 | B1* | 7/2001 | Tanaka et al. .............. 455/515 |
| 6,336,174 | B1 | 1/2002 | Li et al. |
| 6,385,726 | B1 | 5/2002 | Hasebe et al. |
| 6,501,718 | B1 | 12/2002 | Ono et al. |
| 7,082,539 | B1* | 7/2006 | Kitahara et al. ............ 713/189 |
| 2002/0016919 | A1 | 2/2002 | Sims, III |

FOREIGN PATENT DOCUMENTS

| JP | 62-278691 A | 12/1987 |
| JP | 4-199246 A | 7/1992 |
| JP | 9-190346 A | 7/1997 |
| JP | 11-65934 A | 3/1999 |
| JP | 11-175406 | 7/1999 |
| WO | WO 99/42996 A1 | 8/1999 |

\* cited by examiner

*Primary Examiner*—Jasmine Song
(74) *Attorney, Agent, or Firm*—Sughrue Mion, PLLC

(57) ABSTRACT

A disk system has contents play-back restriction mechanism. A contents storage section, which contents received from a regular server are stored in. A capacitor charged with power supplied from the server. A volatile memory backed up by the capacitor and stores data necessary for the play-back of the contents received from the server. A controller for controlling the contents storage section and the volatile memory for reading and writing data when supplied with power from a regular player or the server.

46 Claims, 12 Drawing Sheets

DISK SYSTEM AND MEDIUM WITH CONTENTS PLAY-BACK RESTRICTION MECHANISM

This is a continuation of application Ser. No. 09/911,710 filed Jul. 25, 2001 now abandoned; the disclosure of which is incorporated herein by reference.

BACKGROUND OF THE INVENTION

This application claims benefit of Japanese Patent Application No. 2000-227691 filed on Jul. 27, 2000, the contents of which are incorporated by the reference.

The present invention relates to a disk system with contents play-back restriction mechanism for restricting the contents play-back by deleting contents read-out data stored in a memory after lapse of a predetermined time.

As a pertaining prior art, a method of storing contents on a DVD-ROM or the like is well known. In this method, ciphered contents and contents deciphering key are stored on a medium, and a player deciphers the contents by reading out the contents deciphering key stored on the medium and then plays back the contents.

As another pertaining art, a method is well known, in which, while contents are stored in a DVD-ROM or the like, a player obtains contents deciphering key from a center by a telephone call.

As a further pertaining prior art, Japanese Patent Laid-Open No. 11-175406 discloses a method, in which a battery and a connection detector are provided in an auxiliary memory such as to delete data upon illegal data take-out detection.

In the first-mentioned prior art method, the data written on the medium is not changed with the lapse of time and can thus be viewed forever. Therefore, a problem is posed that when renting contents with a DVD-ROM for a fixed period of time, it becomes necessary to return the DVD-ROM to the shop after the lapse of the fixed time.

In the second-mentioned prior art, every time when playing back contents, the player should obtain the contents key by a telephone call, which is very cumbersome.

In the third-mentioned prior art, although it is possible to realize protection of data from illegal take-out thereof, it is impossible to realize a function as in the case of renting contents, i.e., a function of permitting effective read-out of contents until the lapse of a certain period of time but not permitting subsequent contents play-back.

SUMMARY OF THE INVENTION

The present invention was made in order to solve the above problems inherent in the prior art, and it has an object of providing a disk system and a medium with contents play-back restriction mechanism for disabling the contents play-back after the lapse of a certain period of time.

According to an aspect of the present invention, there is provided a disk system with contents play-back restriction mechanism comprising a contents storage section, which contents received from a regular server are stored in, a capacitor charged with power supplied from the server, a volatile memory backed up by the capacitor and stores data necessary for the play-back of the contents received from the server, and a controller for controlling the contents storage section and the volatile memory for reading and writing data when supplied with power from a regular player or the server.

According to another aspect of the present invention, there is provided a disk system with contents play-back restriction mechanism comprising a contents storage section, which contents received from a regular server are stored in, a battery, a timer backed up by the battery, a value corresponding to rental time data of the contents being set in the timer from the server, a volatile memory backed up by the battery, data necessary for the play-back of the contents being stored in the volatile memory from the server and deleted in correspondence to the output of the timer, and a controller for controlling the contents storage section, the timer and the volatile memory for reading data and writing when receiving power supplied form a regular player or the server.

According to other aspect of the present invention, there is provided a disk system with contents play-back restriction mechanism comprising a contents storage section, which contents received form a regular server are stored in, a capacitor charged by power supplied form the server, a timer backed up by the capacitor, data necessary for the play-back of the contents being stored in the timer from the server and deleted in correspondence to the output of the timer of, and a controller for controlling the contents storage section, the timer and the volatile memory for reading and writing data when receiving power from a regular player or the server.

The contents stored in the contents storage section have been ciphered and the data necessary for the play-back of the contents includes a deciphering key for deciphering the contents.

The data necessary for the play-back of the contents includes data of a procedure of read-out control of the contents storage section.

The disk system with contents play-back restriction mechanism includes a mechanism having a switch provided on power supply line led to the volatile memory such that, when unfair accessing is performed, the switch is turned off to delete data having been held in the volatile memory.

According to other aspect of the present invention, there is provided a disk system with contents play-back restriction mechanism comprising a data storage section, which ciphered contents and a deciphering key for deciphering the contents are stored in from a regular server, a battery, a timer backed up by the battery, a value corresponding to rental time data of the contents being set in the timer from the server, and a controller for controlling the data storage section and the time for reading and writing data when receiving power supplied form a regular player or the server and deleting the deciphering key stored in the data storage section in correspondence to the output of the timer.

According to still other aspect of the present invention, there is provided a disk system with contents play-back restriction mechanism comprising a data storage section, which ciphered contents and a deciphering key for deciphering the contents are stored in from a regular server, a capacitor charged with power from the server, a timer backed up by the capacitor, a value corresponding to rental time data of the contents being set in the timer from the server, and a controller for controlling the data storage section and the timer for reading and writing data and deleting the deciphering key stored the data storage section in correspondence to the output of the timer.

The connection of the disk system to the server or the player is confirmed by the outer shape of an interface connected to the server or the player or by the controller.

According to further aspect of the present invention, there is provided a disk system with contents play-back restriction mechanism comprising a contents storage section, which contents are written and stored in by a regular server and read out from by a regular player, a capacitor charged with power from the server, a volatile memory backed up by the capacitor, data necessary for the play-back of the contents being stored in the volatile memory from the server, and a controller for controlling the volatile memory for reading and writing data when receiving power supplied from a regular player or the server.

According to still further aspect of the present invention, there is provided a medium with contents play-back restriction mechanism comprising, which contents are written and stored in by a regular server and read out from by a regular layer, a battery, a timer backed up by the battery, a value corresponding to rental time data of the contents being set in the timer from the server, a volatile memory, which data necessary for the play-back of the contents is stored in from the server and deleted in correspondence to the output of the timer, and a controller for controlling the timer and the volatile memory for reading and writing data when receiving power supplied from a regular player or the server.

According to other aspect of the present invention, there is provided a medium with contents play-back restriction mechanism comprising a contents storage section, which contents are written and stored in by a regular server and read out from by a regular player, a capacitor charged with power from the server, a timer backed up by the capacitor, a value corresponding to rental time data of the contents being set in the timer from the server, a volatile memory backed up by the capacitor, data necessary for the play-back of the contents being stored in the volatile memory from the server and deleted in correspondence to the output of the timer, and a controller controlling the timer and the volatile memory for reading and writing data when receiving power supplied from a regular player or the server.

The contents stored in the contents storage section have been ciphered and the data necessary for the play-back of the contents includes a deciphering key for deciphering the contents.

The data necessary for the play-back of the contents includes data of a procedure of read-out control of the contents storage section.

The disk system with contents play-back restriction mechanism includes a mechanism having a switch provided on power supply line led to the volatile memory such that, when unfair accessing is performed, the switch is turned off to delete data having been held in the volatile memory.

According to still other aspect of the present invention, there is provided a disk system with contents play-back restriction mechanism comprising a data storage section, which ciphered contents and a deciphering key for deciphering the contents are written and stored in by a regular server and read out by a regular player, a battery, a timer backed by the battery, a value corresponding to the rental time data of the contents being set in the timer, and a controller for controlling the timer for reading and writing data when receiving power supplied from the player or the server, wherein the deciphering key stored in the data storage section is deleted by the player in correspondence to the output of the timer.

According to further aspect of the present invention, there is provided a disk system with contents play-back restriction mechanism comprising a data storage section, which ciphered contents and a deciphering key for deciphering the contents are written and stored by a regular server and read out by a regular player, a timer backed by the capacitor, a value corresponding to rental time data of the contents being set in the timer from the from the server, and a controller for controlling the timer for reading and writing data when receiving power supplied from the player or the server, wherein the deciphering key stored in the data storage section is deleted by the player in correspondence to the output of the timer.

The connection of the disk system to the server or the player is confirmed by the outer shape of an interface connected to the server or the player or by the controller.

Other objects and features will be clarified from the following description with reference to attached drawings.

PREFERRED EMBODIMENTS OF THE INVENTION

Preferred embodiments of the present invention will now be described with reference to the drawings.

Figure 1:
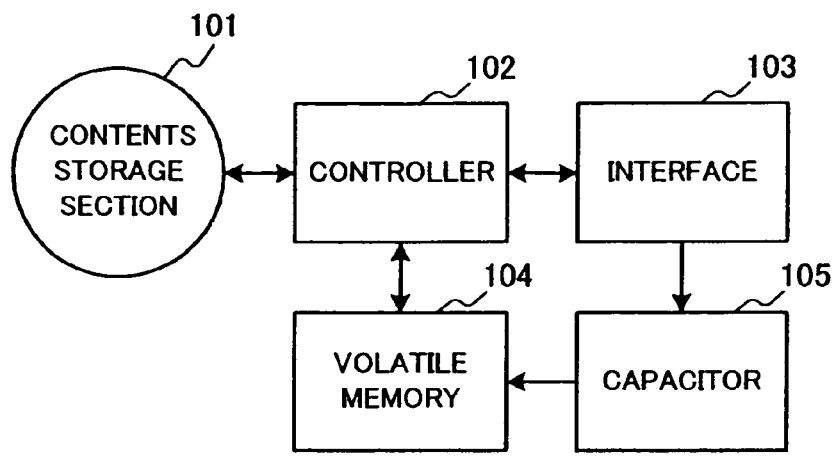
FIG. 1 is a block diagram showing a first embodiment of the disk system with contents play-back restriction mechanism according to the present invention.

FIG. 1 is a block diagram showing a first embodiment of the disk system with contents play-back restriction mechanism according to the present invention. Referring to the Figure, this embodiments of the disk system with contents play-back restriction mechanism comprises a contents storage section 101, a controller 102, an interface 103, a volatile memory 104 and a capacitor 105.

The contents storage section 101 is a part, which is controlled for reading and writing data by the controller 102, and can store contents received from a regular server. As this section 101 may be used a disk medium, a non-volatile memory or the like.

The controller 102 controls the contents storage section 101 and the volatile memory 104 when it receives power supplied from the regular server or player. The controller 102 may also have a function of checking whether a device, which the disk system with contents play-back restriction mechanism has been connected to, is a regular one.

The interface 103 is to be connected to the regular server or player. When the interface 103 receives power supplied thereto, it externally inputs or outputs contents and data necessary for playing back the contents. When the interface 103 confirms connection of the disk system with contents playback restriction mechanism to the regular server, it charges the capacitor 105 with power supplied from the regular server.

The volatile memory 104 is backed up by the capacitor 105 and controlled for reading and writing data by the capacitor 105, and in this way it can store data necessary for the contents play-back. The data necessary for the contents play-back may be a deciphering key for deciphering the contents or control data for contents read-out control by the controller 102.

The capacitor 105 is connected to the interface 103, and when the connection of the disk system with contents play-back restriction mechanism to the regular server has been confirmed, it is charged with power from the regular server via the interface 103 and thus back up the volatile memory 104.

The operation of this embodiment of the disk system with contents play-back restriction mechanism will now be described with reference to the drawings. Here, a case will be considered, in which a deciphering key is used as data necessary for the contents play-back.

Figure 2:
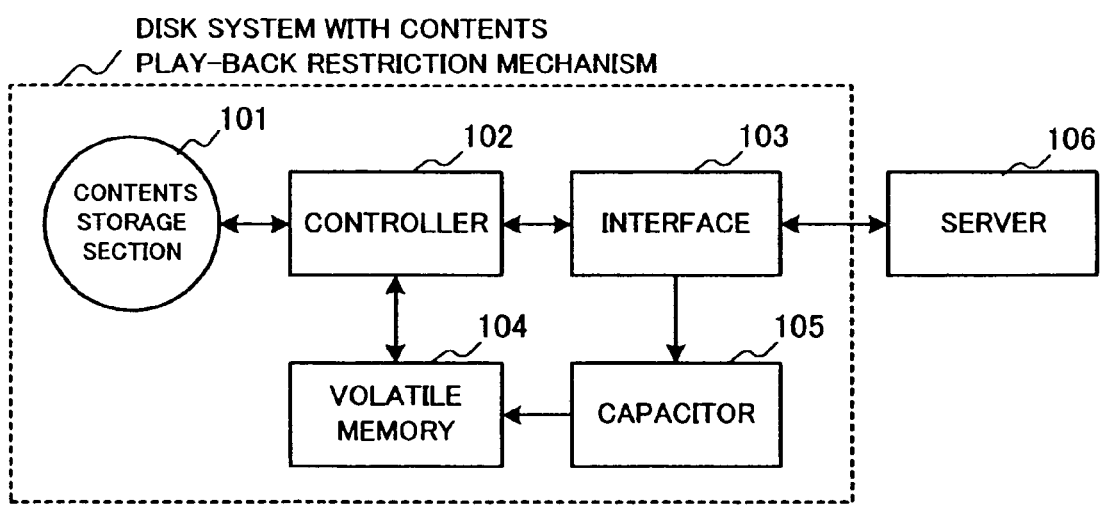
FIG. 2 is a block diagram showing a system, which is obtained by connecting this embodiment of the disk system with contents play-back restriction mechanism to a server for contents writing.
Figure 3:
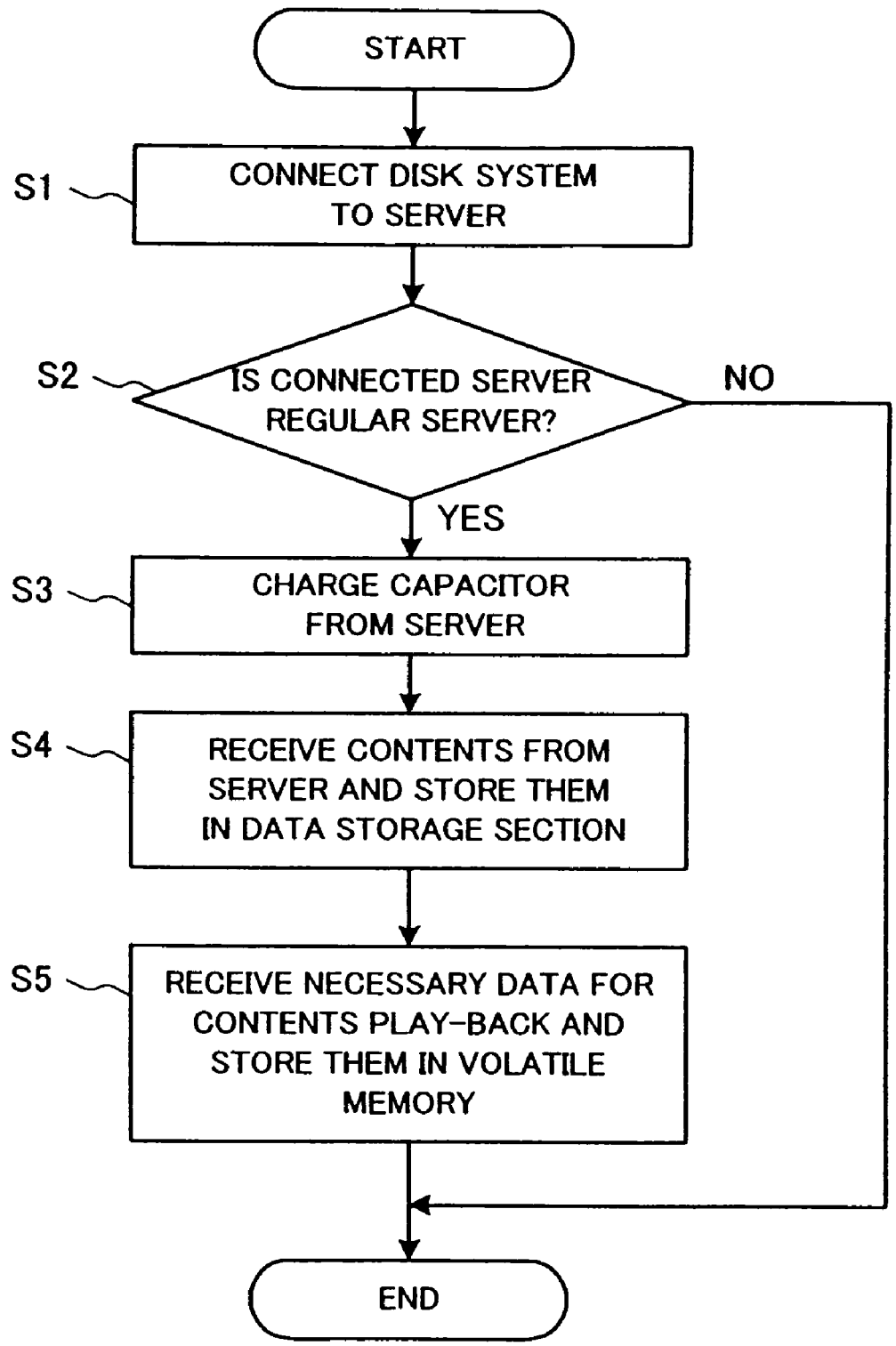
FIG. 3 is a flow chart illustrating the operation when this embodiment of the disk system with contents play-back restriction mechanism is connected to the server for contents writing.

FIG. 2 is a block diagram showing a system, which is obtained by connecting this embodiment of the disk system with contents play-back restriction mechanism to a server for contents writing. FIG. 3 is a flow chart illustrating the operation when this embodiment of the disk system with contents play-back restriction mechanism is connected to the server for contents writing.

Contents which have been ciphered and a deciphering key for deciphering the ciphered contents have been stored in a server 106. The disk system with contents play-back restriction mechanism is connected by the interface 103 to the server 106 (step S1). At this time, the disk system with contents play-back restriction mechanism checks whether the device with the disk system connected thereto is a regular server (step S2). The check may be performed in various methods, from the simplest method, in which the fitness of the outer shape of the interface 103 is checked, to a method, in which the controller 102 lets the disk system with contents play-back restriction mechanism and the server confirm each other. When it is not determined as a result of the check of the interface 102 or the check performed by a confirmation section of the controller 102 that the server with the disk system connected thereto is a regular one, the capacitor 105 is not charged, and an end is brought to the routine.

When it is determined as a result of the check of the interface 103 or the check performed by the confirmation section of the controller 102 that the server is a regular one, the capacitor 105 is charged with power supplied thereto from the server via the interface 103 (step S3). In the case of the check of the sole outer shape of the interface 103, as soon as the disk system with contents play-back restriction mechanism is connected, the capacitor 105 is charged with power supplied from the server via the interface 103. In the other case, the capacitor 105 is charged in response to the output of a command for power supply to it from the confirmation section in the controller 102 to the interface 103.

Subsequently, the controller 102 receives contents (i.e., ciphered contents in this case) from the server 106 via the interface 103 and lets these contents be stored in the contents storage section 101 (step S4). The controller 102 also receives data necessary for the contents play-back (i.e., a deciphering key in this case) from the server 106 via the interface 103 and lets the data be stored in the volatile memory 104 (step S5).

The disk system with contents play-back restriction mechanism, in which the contents have been written by the server 106, is connected to a user's player for the play-back of the written contents.

Figure 4:
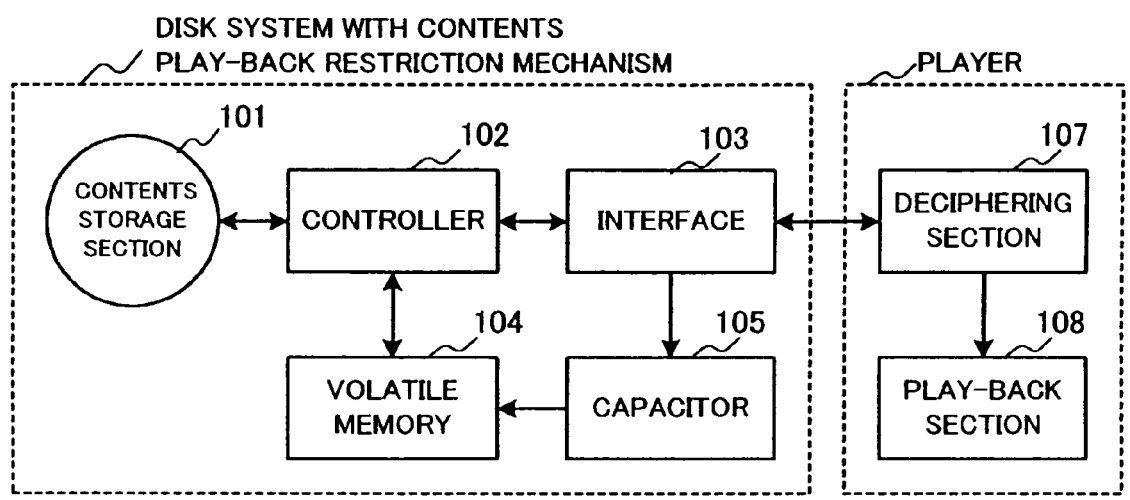
FIG. 4 is a block diagram showing a system, which is obtained by connecting this embodiment of the disk system with contents play-back restriction mechanism to a player.
Figure 5:
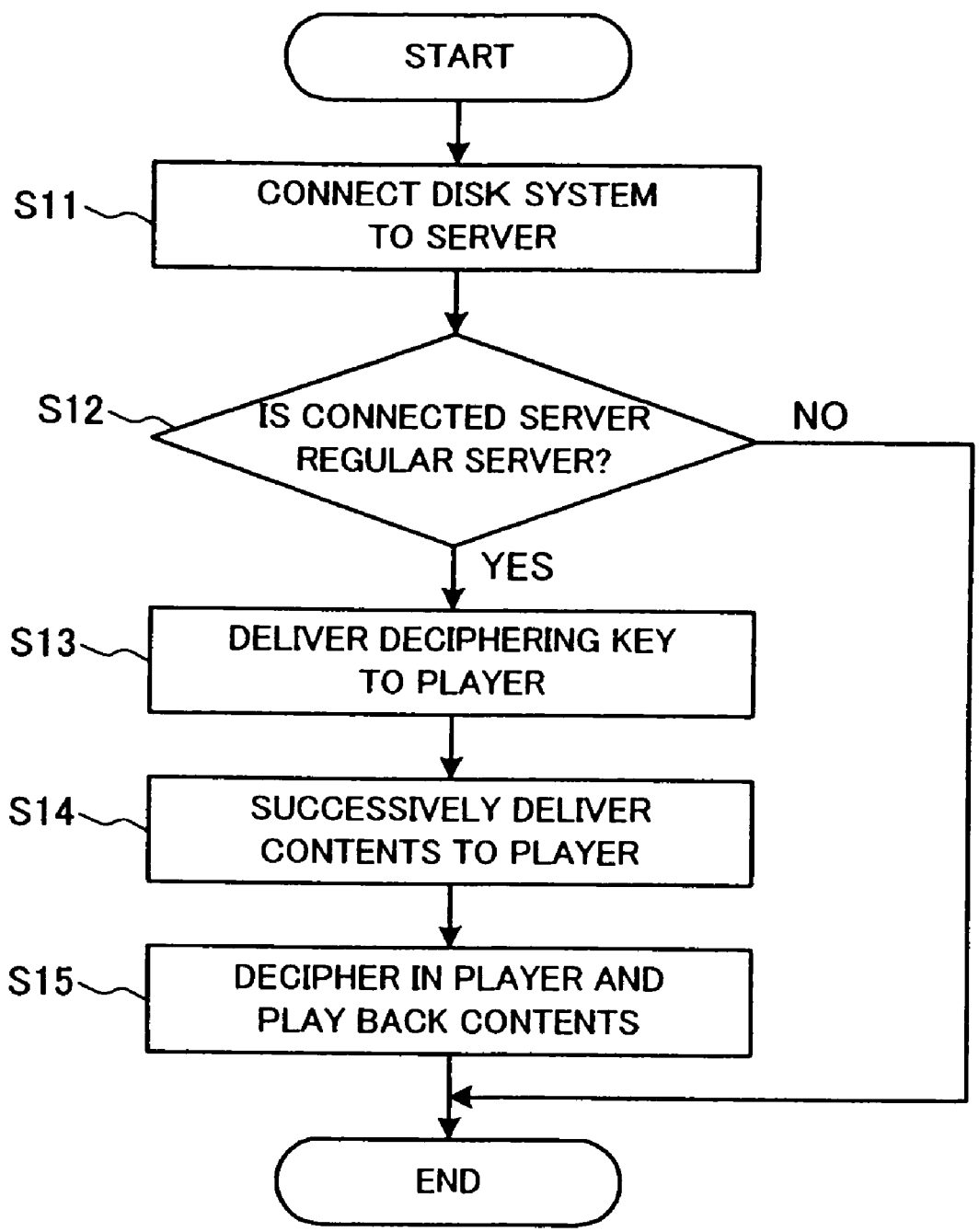
FIG. 5 is a flow chart illustrating the operation when this disk system with contents play-back restriction mechanism is connected to the player.

FIG. 4 is a block diagram showing a system, which is obtained by connecting this embodiment of the disk system with contents play-back restriction mechanism to a player. FIG. 5 is a flow chart illustrating the operation when this disk system with contents play-back restriction mechanism is connected to the player.

First, the disk system with contents play-back restriction mechanism is connected to the player (step S11). Then, a check is performed in the disk system with contents play-back restriction mechanism as to whether the device with the disk system connected thereto is a regular player (step S12). The check may be performed in the same method as in the server check case. When it has been determined that the device is a regular player, the controller 102 reads out the deciphering key stored in the volatile memory 104 and delivers this key to a deciphering section 107 in the player via the interface 103 (step S13). The controller 102 then reads out the ciphered contents from the contents storage section 101 and delivers these contents via the interface 103 to the deciphering section 107 (step S14). In the player, the delivered contents are deciphered in the deciphering section 107 and then played back in a play-back section 108 (step S15).

When this embodiment of the disk system with contents play-back restriction mechanism is connected to a server other than the regular one, no power is supplied via the interface 103 to the capacitor 105. Therefore, the power stored in the capacitor 105 in the disk system which is at hand of the user, is continuously reduced and, after the lapse of a certain period of time, the terminal voltage across the capacitor 103 becomes lower than the voltage sufficient to back up data stored in the volatile memory 104. As a result, the data stored in the volatile memory 104, i.e., the deciphering key, vanishes. With the vanishing of the deciphering key for deciphering the ciphered contents stored in the contents storage section 101, the contents can no longer be played back by connecting the disk system to the player. It will thus be appreciated that the play-back of contents becomes impossible after the lapse of a predetermined period of time. The certain period of time noted above is determined by the capacity of the capacitor 105 and the flow rate of current caused when backing up the volatile memory 104. The time until the vanishing of the deciphering key thus can be controlled to a certain extent by appropriately selecting the capacity of the capacitor 105.

In the above description, the two data pieces, i.e., the ciphered contents and the deciphering key, from the server 106 are stored in the disk system with contents play-back restriction mechanism. However, once the ciphered contents have been stored, it is possible to store the deciphering key received from the server 106 in the volatile memory 104. Also, while in the above description the controller 102 and the volatile memory 104 are provided separately, it is conceivable that the controller 102 internally includes the volatile memory 104. In this case, the bus between the controller 102 and the volatile memory 104 may not be exposed to the outside, thus making it more difficult to copy the volatile memory data.

In this embodiment of the disk system with contents play-back restriction mechanism, it is also possible to use control data for contents read-out control by the controller 102 as the data necessary for the contents play-back. This will now be described with reference to FIGS. 1 and 2 again because the system construction concerned is the same.

The operations executed by the controller 102 can be roughly classified into those for reading out data from the contents storage section 101 and those for other purposes. Of these operations control algorithms concerning those other than those of reading out data from the contents storage section 101 are stored in an internal non-volatile memory in the controller 102.

When the disk system with contents play-back restriction mechanism is connected to the server 106, the controller 102 checks whether the server 106 is the regular one. When the controller 102 confirms that the server 106 is the regular one, it charges the capacitor 105 via the interface 103. Subsequently, the controller 102 receives from the server 106 a control algorithm for reading out data from the contents storage section 101, and stores this algorithm in the volatile memory 104.

When it becomes necessary to read out data from the contents storage section 101, the controller 102 reads out contents from the contents storage section 101 with reference to the control algorithm in the volatile memory 104. However, unless the disk system is connected to the server 106 again, the power stored in the capacitor 105 is continuously reduced, and after the lapse of a certain period of time the read-out control algorithm stored in the volatile memory 104 vanishes. With the vanishing of the control algorithm for reading out the contents stored in the contents storage section 101, it is no longer possible to play back the contents by connecting the disk system to the player. It will be seen that after the lapse of a certain period of time it becomes impossible to play back the contents.

In the case of using the read-out control data as data necessary for the contents play-back, the contents stored in the contents storage section 101 need not have been ciphered. In this case, an MPEG (Moving Picture Experts Group) decoder is provided in the disk system with contents play-back restriction mechanism to prevent leakage of the contents data itself to the outside. In this way, it is possible to prevent leakage of non-ciphered contents data to the outside. As the data necessary for the contents play-back may be used such read-out control parameters as disk format parameters as well as the read-out control algorithm.

Figure 6:
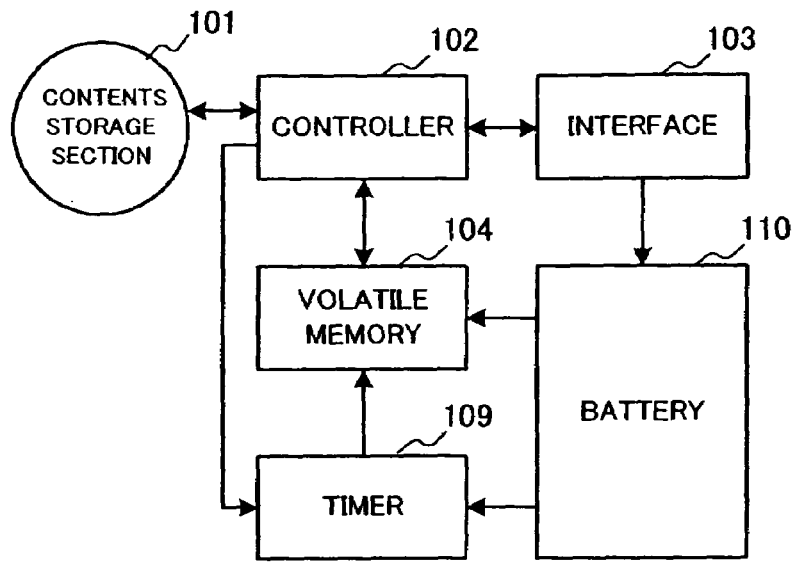
FIG. 6 is a block diagram showing a second embodiment of the disk system with contents play-back restriction mechanism.

FIG. 6 is a block diagram showing a second embodiment of the disk system with contents play-back restriction mechanism. Referring to the Figure, this embodiment of the disk system with contents play-back restriction mechanism comprises a contents storage section 101, a controller 102, an interface 103, a volatile memory 104, a timer 109 and a battery 110.

The contents storage section 101 is a part, which is controlled for reading and writing data by the controller 102 and stores contents received from a regular server. As this section 101 may be used a disk medium, a non-volatile memory or the like.

The controller 102 controls the contents storage section 101, the volatile memory 104 and the timer 109 for reading and writing when it receives power supplied from the regular sever or player. The controller 102 may also have a function of checking whether a device, which the disk system with contents play-back restricting mechanism has been connected to, is a regular one.

The interface 103 is to be connected to the regular server or player. When the interface 103 receives power supplied to it, it externally inputs or outputs contents and data necessary for playing back the contents.

The volatile memory 104 is backed up by the battery 110 and controlled for reading and writing by the controller 105, and in this way it can store data necessary for the contents play-back. The data necessary for the contents play-back may be a deciphering key for deciphering the content or control data for contents read-out control by the controller 102.

The timer 109 receives supply voltage from the battery 110 for timer operation. The timer 109 is also controlled for reading and writing by the controller 102, and receives rental time data of the time until the data necessary for the contents play-back can no longer be read out. The timer 109 is further connected to the volatile memory 104, and serves to delete the data necessary for the contents play-back that is stored in the volatile memory 104 when the output of the timer 109 reaches a predetermined value. Thus, it is possible to accurately control the time until the contents play-back is no longer possible.

The operation of this embodiment of the disk system with contents play-back restriction mechanism will now be described with reference to the drawings.

Figure 7:
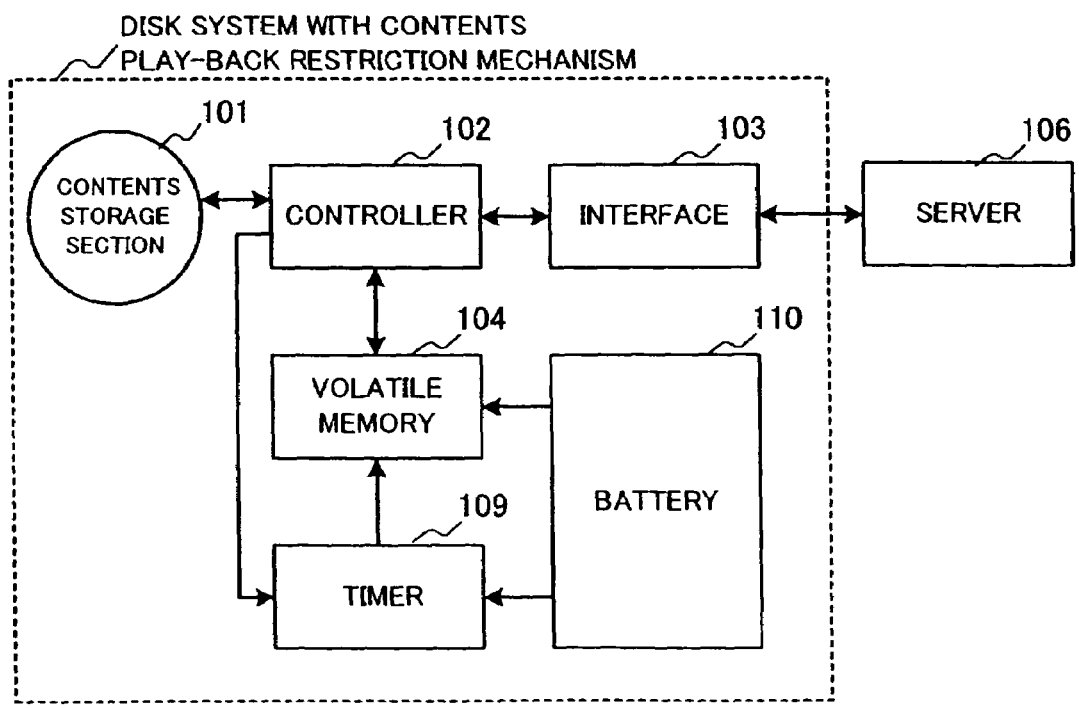
FIG. 7 is a block diagram showing a system, which is obtained by connecting this embodiment of the disk system with contents play-back restriction mechanism is connected to a contents write server.
Figure 8:
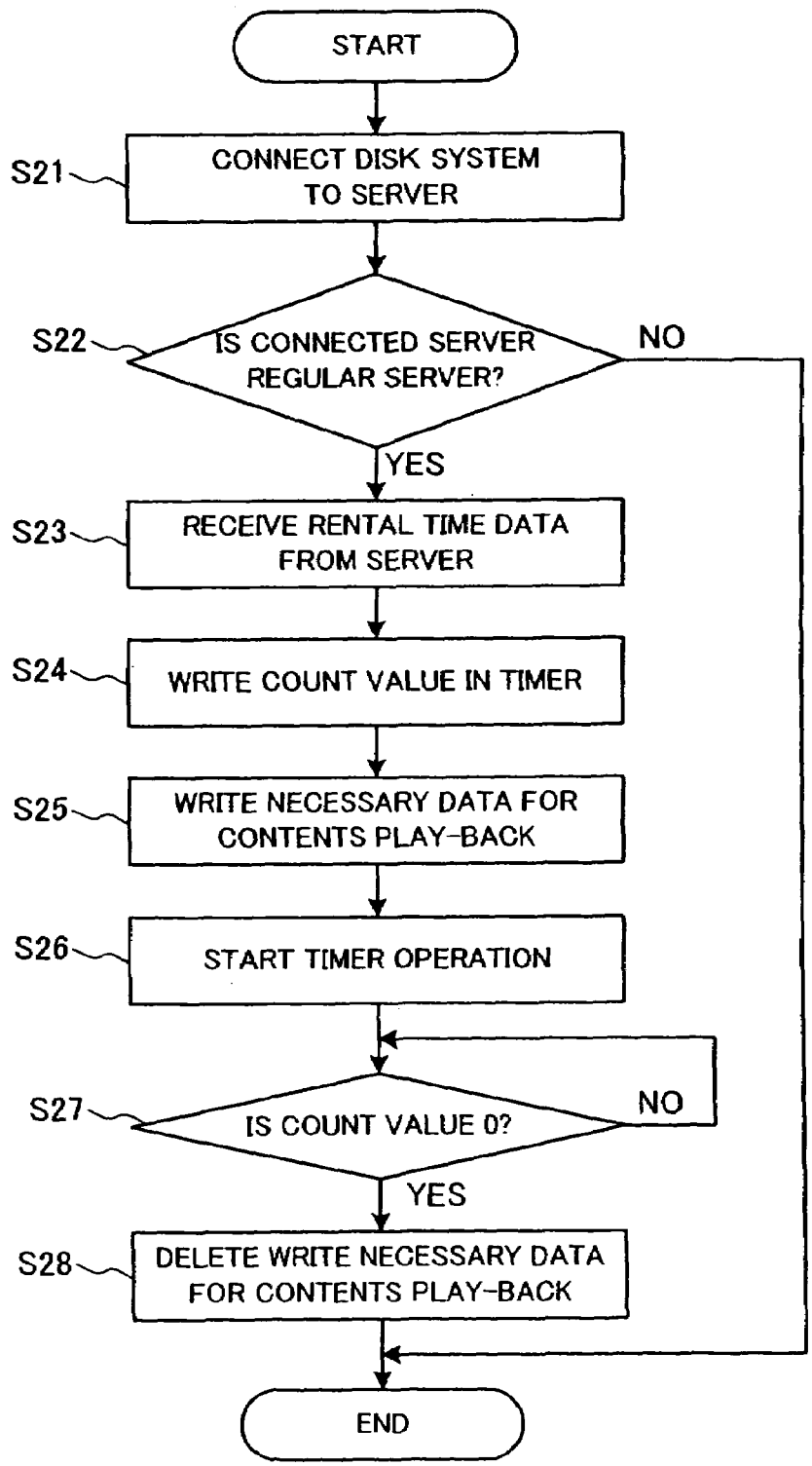
FIG. 8 is a flow chart illustrating the operation of this embodiment of the disk system with contents read-out restriction mechanism to obtain contents rental time data from the server.

FIG. 7 is a block diagram showing a system, which is obtained by connecting this embodiment of the disk system with contents play-back restriction mechanism is connected to a contents write server. FIG. 8 is a flow chart illustrating the operation of this embodiment of the disk system with contents read-out restriction mechanism to obtain contents rental time data from the server.

The contents rental time data is stored in the server 106. The disk system with contents read-out restriction mechanism is connected via the interface 103 to the server 106 (step S21). At this time, the disk system with contents play-back restriction mechanism checks whether the device with the disk system connected thereto is a regular server (step S22). The details of the check have been described, and are no longer described.

When it is confirmed that the device with the disk system connected thereto is a regular one, the controller 102 receives the contents rental time data from the server 106 via the interface 103 (step S23). The contents rental time data may be in the form of time such as 2. days or 48 hours or a timer count such as 1,728,000. When the data is in the form of time, the controller 102 converts the data to a value to be set in the timer 109, and writes the conversion value in the timer 109 (step S24). The controller 102 receives contents and data necessary for the contents play-back, and it stores the received contents in contents storage section 101 and the data necessary for the contents play-back in the volatile memory 104 (step S25). Subsequently, the controller 102 commands the timer 109 to start down-counting (step S26).

When the timer 109 starts operation, a check is performed as to whether the count in an internal counter has become "0" (step S27). When the count has become "0", the timer 109 commands the volatile memory 104 to delete the data stored therein, which is necessary for the contents play-back (step S28). For the deletion of the data, a circuit for writing "0" in a predetermined area of the volatile memory 104 may be provided inside the timer 109. It is also possible to provide a mechanism for turning off a switch on the power supply line led from the battery 110 to the volatile memory 104.

While the above description of operation was made such that the controller 102, the volatile memory 104 and the timer 109 were provided separately, it is also possible to provide the volatile memory 104 and the timer 109 inside the controller 102. In this way, the possibility that a deletion command provided from the timer 109 to the volatile memory 104 is changed is reduced to obtain more reliable deletion operation.

Figure 9:
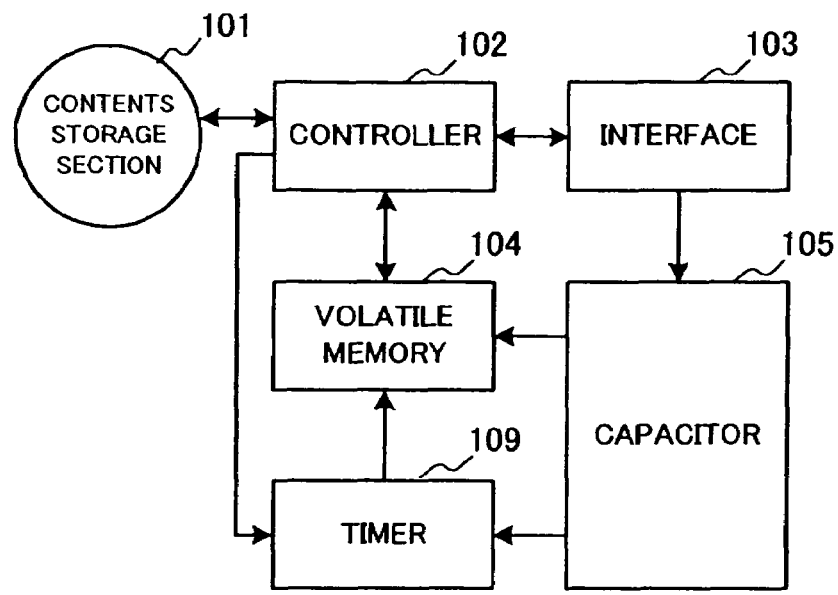
FIG. 9 is a block diagram showing a modification of this embodiment of the disk system with contents play-back restriction mechanism.

FIG. 9 is a block diagram showing a modification of this embodiment of the disk system with contents play-back restriction mechanism. Referring to the Figure, this modification of the disk system with content play-back restriction mechanism, employs a capacitor 105 in lieu of the battery 110 in the disk system with contents play-back restriction mechanism to back up the volatile memory 104 and the timer 109. The capacitor 105 receives power from a server (not shown) via the interface 103 according to a permission of the controller 102. For the remainder, the same description is applicable as the description of the disk system with contents play-back restriction mechanism shown in FIG. 6.

In this modification, the capacitance of the capacitor 105 is selected such that the back-up thereof is usually possible for a time longer than the time of setting data in the timer 106. Thus, when a longer time is erroneously set in the timer 105, it becomes impossible to obtain the contents play-back after the lapse of a time shorter than the duration of the back-up in the case of the battery 110. The accident that the contents play-back is obtainable forever is less liable to take place.

The description so far, of the first and second embodiments of the disk system with contents play-back restriction mechanism and the modification thereof, has been made such that the contents storage section 101 is a non-volatile medium, but it is possible as well a modification, in which the contents storage section 101 is a volatile memory backed up by a battery or a capacitor.

Figure 10:
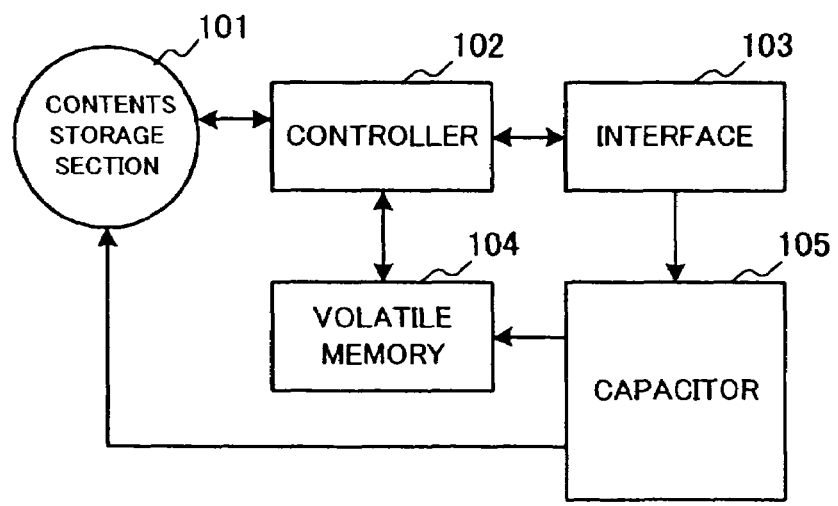
FIG. 10 is a block diagram showing such a modification of the disk system with contents play-back restriction mechanism shown in FIG. 1.

FIG. 10 is a block diagram showing such a modification of the disk system with contents play-back restriction mechanism shown in FIG. 1. Referring to the Figure, in this modification of the disk system with contents play-back restriction mechanism, a volatile memory is used as the contents storage section 101 and backed up as well by the capacitor 105. Thus, when the charge in the capacitor 105 is used up, not only the data necessary for the contents play-back stored in the volatile memory 104 but also the contents themselves vanish. The contents play-back thus becomes impossible after the lapse of a predetermined time unless the capacitor 105 is appropriately re-charged. While the above description has been made such that the contents storage section 101 and the volatile memory 104 are separate, they may be constituted together by an integral unit as well.

Figure 11:
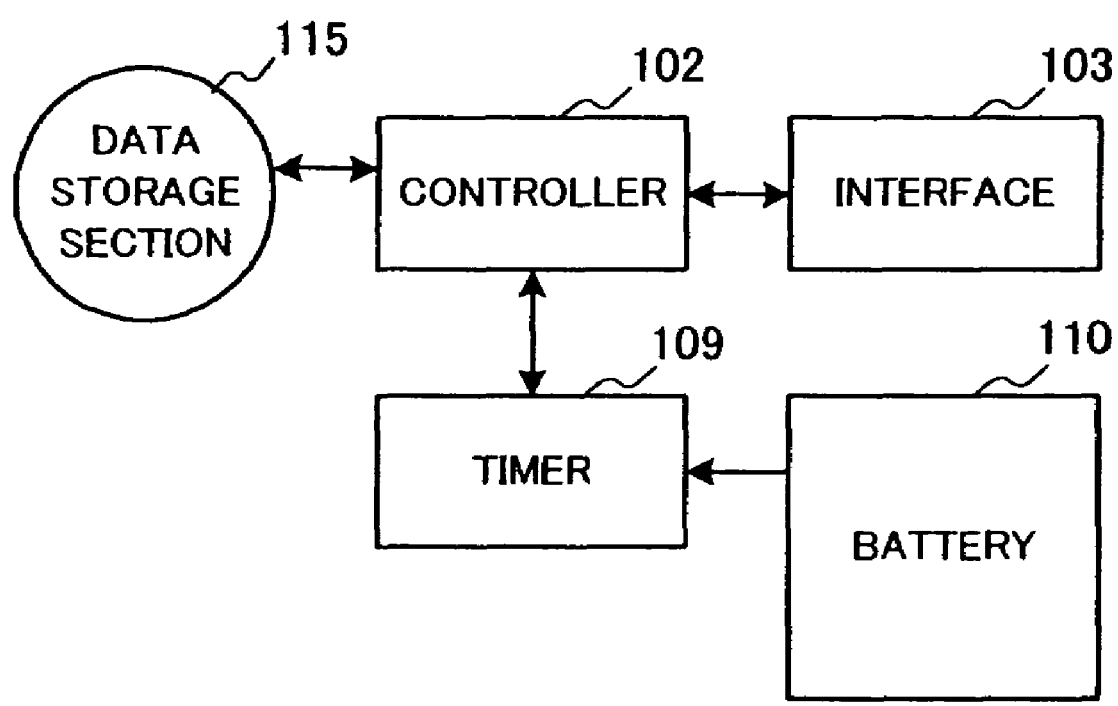
FIG. 11 is a block diagram showing a third embodiment of the disk system with contents play-back restriction mechanism according to the present invention.

FIG. 11 is a block diagram showing a third embodiment of the disk system with contents play-back restriction mechanism according to the present invention. Referring to the Figure, this embodiment of the disk system with contents play-back restriction mechanism comprises a data storage section 115, a controller 102, an interface 103, a timer 100 and a battery 110.

The data storage section 115 is a part, which is controlled for reading and writing by the controller 102 and can store ciphered contents and a deciphering key or deciphering the ciphered contents. As this section may be used a disk memory, a non-volatile memory or the like.

The controller 102 controls the data storage section 115 and the timer 109 for reading and writing data when it receives power supplied from the regular server or player, and deletes the deciphering key stored in the data storage section 115 according to the output of the timer 109. The controller 102 may also have a function of checking whether the device, which the disk system with contents play-back restriction mechanism is connected to, is a regular one.

The interface 103 is to be connected to the regular server or player, and when receiving power supplied thereto, it externally inputs or outputs contents and deciphering key.

The timer 109 is backed up by the battery 110, and can execute its timer operation even when no power is externally supplied. The timer 109 is controlled for reading and writing by the controller 102, and outputs a timer value when it receives contents rental time data of the time until contents can no longer be read out.

The operation of this embodiment of the disk system with contents read-out restriction mechanism will now be described with reference to the drawings.

Figure 12:
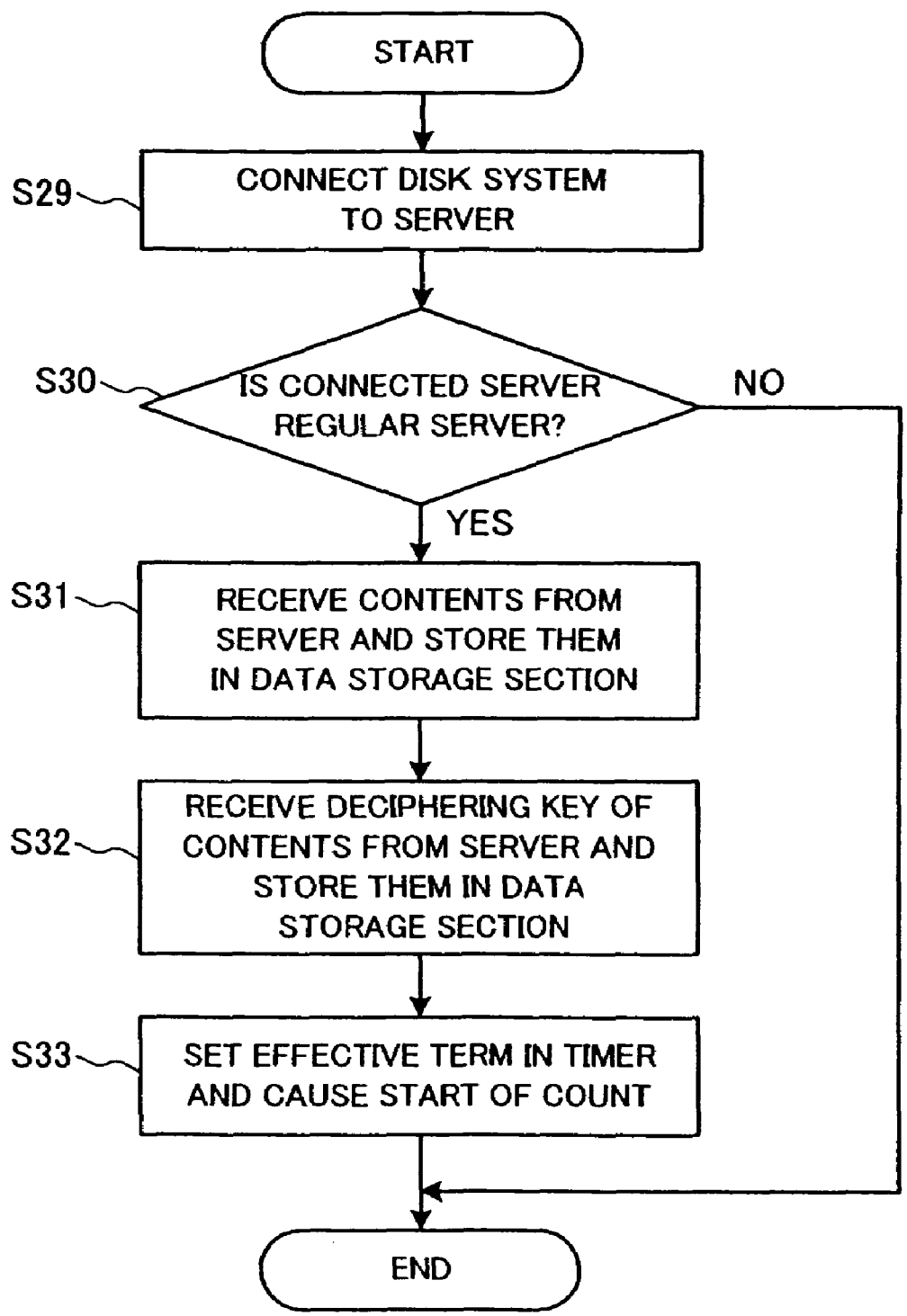
FIG. 12 is a flow chart illustration an operation brought about when this embodiment of the disk system with contents play-back restriction mechanism is connected to a contents write server.

FIG. 12 is a flow chart illustration an operation brought about when this embodiment of the disk system with contents play-back restriction mechanism is connected to a contents write server.

Ciphered contents and contents deciphering key for deciphering the contents are stored in a server (not shown), and the disk system with contents play-back restriction mechanism is connected to the server via the interface 103 (step S29). At this time, the disk system with contents play-back restriction mechanism checks whether the device with the disk system connected thereto is a regular server (step S30). The check is performed in the same method as described before, and is no longer described.

When it is confirmed as a result of the check that the server is a regular server, the controller 102 receives the ciphered contents from the server via the interface 103, and stored the received contents in the data storage section 115

(step S31). The controller 102 also receives the deciphering key from the server via the interface 103, and stores this key in the data storage section 115 (step S32). Subsequently, the controller 102 receives, from the server, time data of the effective term until it is no longer possible to read out contents, then sets the effective term in the timer 109, and causes the start of counting (step S33). The steps S31 to S33 may be executed in any order.

When the timer 109 is started after the writing of the effective time data received from the server in the timer 109, it continues counting even when it is separated from the server because it is backed up by the battery 110. The timer 106 stops its operation and holds the arrival of the effective term when the count becomes "0" in the case where it is of the count-down type, or when the count becomes a value indicating the effective term in the case where it is of the count-up type.

Figure 13:
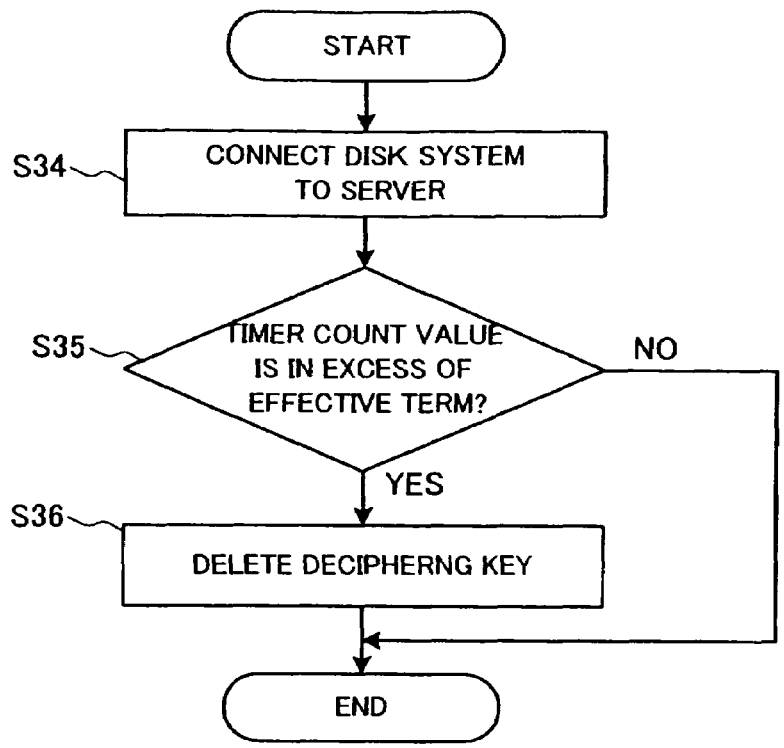
FIG. 13 is a flow chart showing the first operation executed when this embodiment of the disk system play-back restriction mechanism is connected to a user's player.

FIG. 13 is a flow chart showing the first operation executed when this embodiment of the disk system playback restriction mechanism is connected to a user's player.

First, the disk system with contents play-back restriction mechanism is connected to the player (step S34). At this time, the disk system with contents play-back restriction mechanism receives main power supplied from the player. Then, the controller 102 in the disk system with contents play-back restriction mechanism checks whether the count of the timer 109 represents a time in excess of the effective term (step S35). If the represented time is in excess of the effective term, the controller 102 deletes the deciphering key stored in the data storage section 115 (step S36). If the represented time is not in excess of the effective term, the contents play-back operation is executed, which is the same described before (steps S11 to S15), and will not be described here.

In the above description, the battery is used as power supply for backing up the timer 109, but is also possible to use a capacitor. The capacitor may be charged from a server or player.

It will be appreciated that when the effective term has been elapsed, the deciphering key stored in the data storage section is deleted as soon as external main power is supplied. Thus, when the effective terminal is over, it is no longer possible to unfairly take out the deciphering key.

Figure 16:
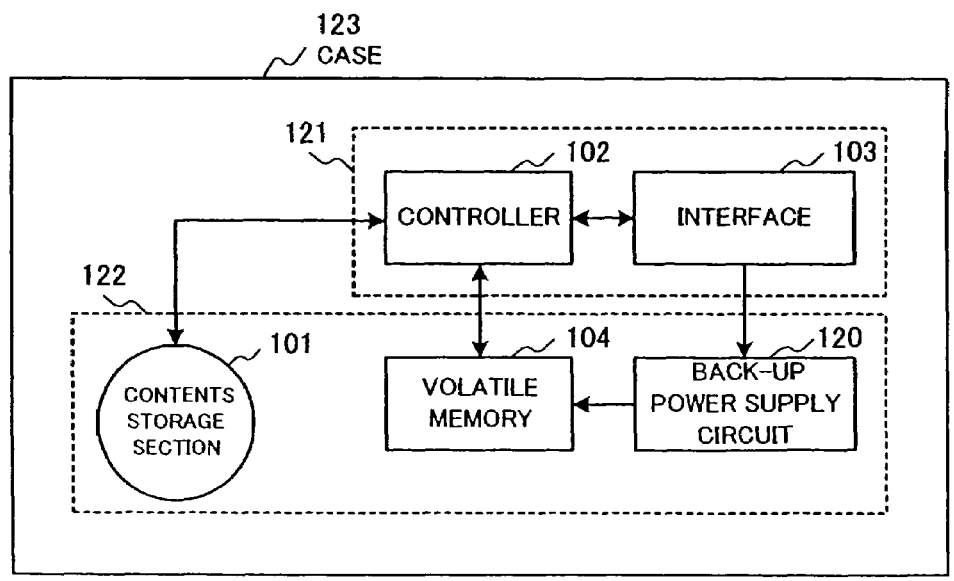
FIG. 16 is a block diagram showing a fourth embodiment of the disk system with contents play-back restriction mechanism according to the present invention.

FIG. 16 is a block diagram showing a fourth embodiment of the disk system with contents play-back restriction mechanism according to the present invention. This embodiment of the disk contents with contents play-back restriction mechanism employs a back-up power supply circuit 120 in lieu of the capacitor 105 shown in FIG. 1. For the remainder the construction is the same. The contents storage section 101 is a part, which stores contents. As this section is used a disk medium, a non-volatile memory, etc. The controller 102 reads out contents from the content storage section 101, and transmits the read-out content via the interface 103 to the outside. The volatile memory 104 is backed up by the back-up power supply circuit 120, and stores data necessary for the contents play-back. The data necessary for the contents play-back may be a deciphering key for deciphering ciphered contents, control data for controlling the controller 102 to read out data from the contents storage section 101. The volatile memory 104 is connected to the controller 102, and the controller 102 reads out or writes the data necessary for the contents play-back from or in the volatile memory 104. The back-up power supply circuit 120 is also connected to the interface 103. The back-up power supply circuit 120 is charged by power externally supplied via the interface 103. The controller 102 and the interface 103 together constitute a printed circuit board 121, and the contents storage section 101, the volatile memory 104 and the back-up power supply circuit 120 together constitute a disk enclosure structure 122. The printed circuit board 121 and the disk enclosure structure 122 are combined to constitute a system, which is sealed in a case 123.

Figure 17:
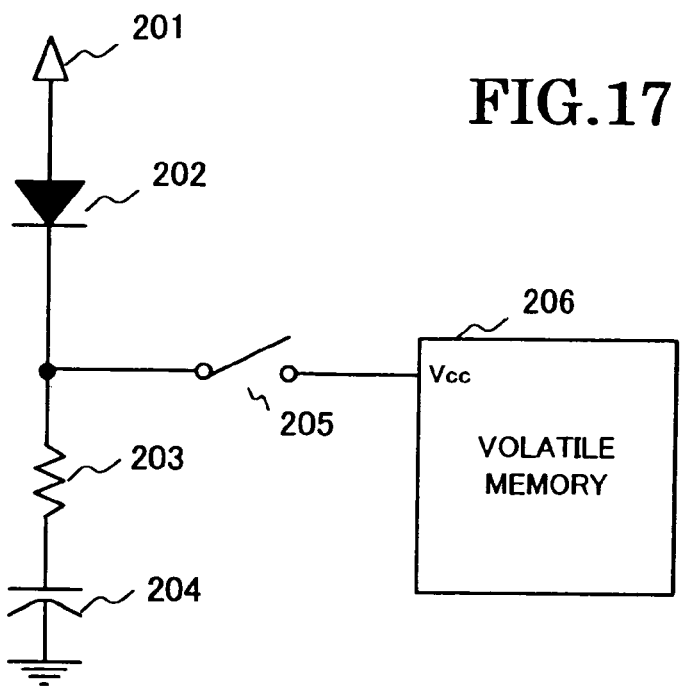
FIG. 17 shows a construction example of the back-up power supply circuit.

FIG. 17 shows a construction example of the back-up power supply circuit. When a regular server is connected to the outside, a forward current flows through an interface 201 to a diode 202 and thence through a switch 205 to a volatile memory 206. At the same time, a capacitor 204 is charged. The interface 201 and the volatile memory 206 are the interface 103 and the volatile memory 104, respectively, shown in FIG. 1. When no regular server is connected to the outside, although the capacitor 204 functions as a back-up power supply for the volatile memory 206, the charge stored in the capacitor 204 is continuously reduced and, upon lapse of a certain term, it becomes lower than a voltage sufficient to back up data stored in the volatile memory 206, that is, the data stored in the volatile memory 206 vanishes. As a result, it is no longer possible to play back contents by connecting the disk system with contents play-back restriction mechanism to the player. In this example, the switch 205 is adapted to be turned off when an unfair accessing is performed, such as separating the printed circuit board 121 and the disk enclosure structure 122, opening the lid thereof or opening the case 123. The mechanism for turning off the switch 205 upon separation of the printed circuit board 121 and the disk enclosure structure 122, may be one, which turns off the switch 205 when a connection screw between the printed circuit board 121 and the disk enclosure structure 122 is removed, and one, in which a contact type connector is provided between the printed circuit board 121 and the disk enclosure structure 122. The mechanism for turning off the switch 205 when the lid of the disk enclosure structure 122 is opened may be one, in which a connector is provided between the disk enclosure structure 122 and the lid. The mechanism for turning off the switch 205 when the case 123 is opened may be one, which adopts a connector mechanism in a fitting part of the case 123.

Where the above mechanisms are appropriately adopted, the switch 205 is turned off as soon as an unfair accessing takes place. As a result, the data that has been stored in the volatile memory 206 can no longer be held, and the disk system can no longer be used if it is re-assembled to the original form. In this way, it is possible to prevent unfair use of the contents. Particularly, by the provision of a mechanism for automatically deleting the volatile memory data in the event of separating or opening a part of the disk system, it is possible to prevent unfair use or leakage of the playback data stored in the volatile memory 206 due to unfair power supply to or charging of the capacitor 204.

Figure 18:
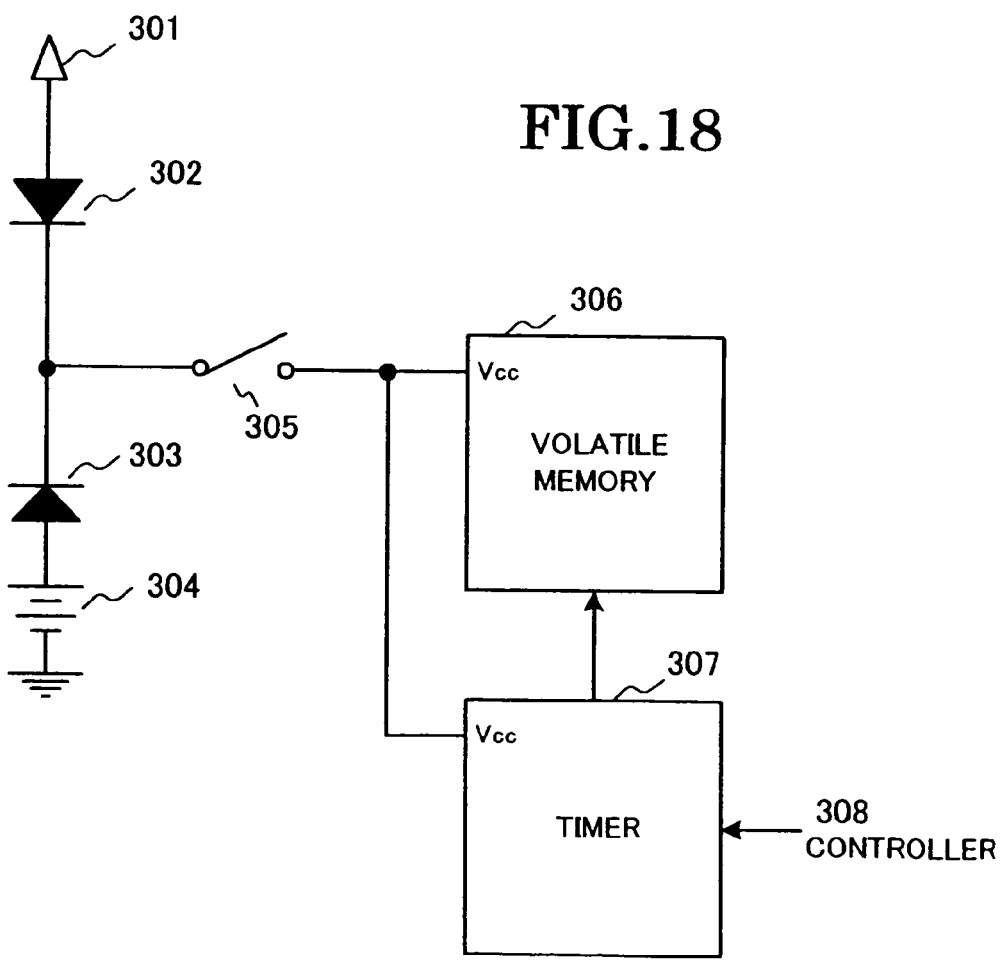
FIG. 18 shows another construction example of the back-up power supply circuit, which uses a battery in lieu of the capacitor for backing up the volatile memory.

FIG. 18 shows another construction example of the back-up power supply circuit, which uses a battery in lieu of the capacitor for backing up the volatile memory. When a regular server is connected to the outside, a forward current flows through an interface 201 to a diode 302 and thence through a switch 305 to a volatile memory 306 and a timer 307. When no regular server is connected to the outside, a battery 304 functions as a back-up power supply for the volatile memory 306 and the timer 307. The timer 307 is connected to a controller 308, and receives from the controller 308 time data until it is no longer possible to read out contents from the controller 306. The timer 307 is also connected to the volatile memory, and it serves to delete the data necessary for playing back the contents stored in the volatile memory 306 upon reaching of predetermined count value of the timer 307. In this way, it is possible to accurately control time until it is no longer possible to play back contents. The interface 301, the volatile memory 306 and the controller 308 correspond to the interface 103, the volatile memory 104 and the controller 102, respectively, in FIG. 1. In this example of the circuit construction, like the above example, the switch 306 is adapted to be turned off when an unfair accessing is performed, such as separating the printed circuit board 121 and the disk enclosure structure 122, opening the lid thereof or opening the case 123. With the above mechanisms appropriately adopted, in the event of an unfair accessing the volatile memory 306 can no longer hold the stored data, and the disk system can no longer be used if it is re-assembled to the original form. In this way, it is possible to prevent unfair use of the contents. Also, it is possible to prevent leakage of the play-back data stored in the volatile memory 306.

This fourth embodiment is applicable to systems of the type of using a volatile memory for storing data, such as the above first and second embodiments and the modifications thereof. The provision of this function has an effect of promoting the prevention of the unfair use of contents.

The description so far of the first to fourth embodiments of the disk system with contents play-back restriction mechanism and the modifications, has been such that the controller 102 controls the contents storage section 101 or the data storage section for reading and writing data. However, it is also possible to arrange such that the contents storage section 101 or the data storage section is controlled for reading and writing data by a medium read/write section in a regular server or player, while providing a medium with contents play-back restriction mechanism, which does not have any medium read/write section.

Figure 14:
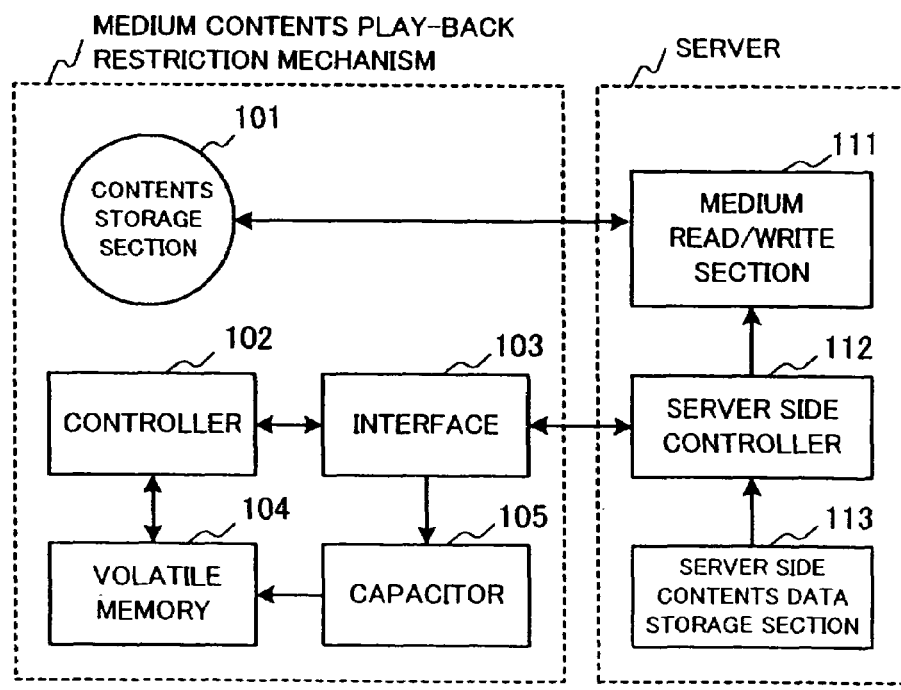
FIG. 14 is a block diagram showing the functional constitution of a medium contents play-back restriction mechanism and a server as a modification of the first embodiment shown in FIG. 1.

FIG. 14 is a block diagram showing the functional constitution of a medium contents play-back restriction mechanism and a server as a modification of the first embodiment shown in FIG. 1.

The contents storage section 101 is independent of the controller 102, and a medium with contents play-back restriction mechanism is provided, which does not have any medium read/write section. In other words, the server has a medium read/write section 101 for controlling the contents storage section 101 for reading and writing data.

Contents and data necessary for the play-back of the contents are stored in a server side contents data storage section 113. A server side controller 112 reads out the contents from the server side contents data storage section 113, and writes the read-out data in the contents storage section 101 in the medium with contents play-back restriction mechanism via the medium read/write section 111. The server side controller 112 reads out the data necessary for the contents play-back from the server side contents data storage section 113, and delivers the read-out data to the controller 102 via the interface 103 in the medium with contents play-back restriction mechanism. The controller 102 stores the delivered data in the volatile memory 104. The method of charging the capacitor 105 is the same as described before, and is not described any further.

Figure 15:
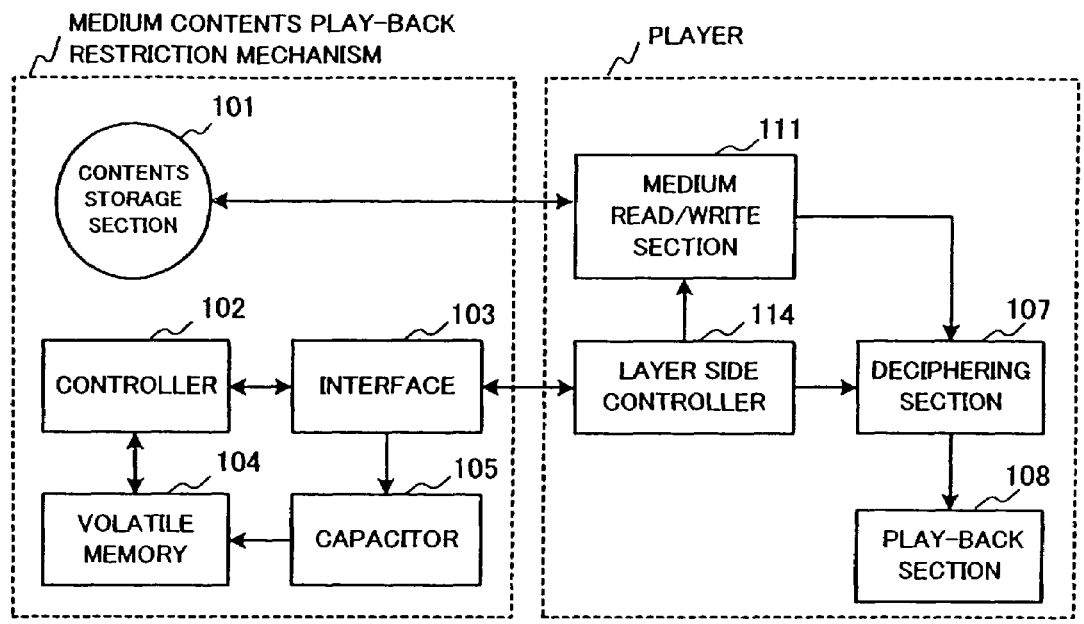
FIG. 15 is a block diagram showing the functional constitution of a medium with contents play-back restriction mechanism and a player as another modification of the first embodiment shown in FIG. 1.

FIG. 15 is a block diagram showing the functional constitution of a medium with contents play-back restriction mechanism and a player as another modification of the first embodiment shown in FIG. 1.

A player side controller 114 receives the data necessary for the contents play-back stored in a volatile memory 104 in the medium with contents play-back restriction mechanism via a controller 102 and an interface 103. Where the data necessary for the contents play-back is a contents deciphering key, the player side controller 114 feeds out this data to a deciphering section 107. Where the data necessary for the contents play-back is control data for a medium read/write section 111, the player side controller 114 feeds out this data to the medium read/write section 111. Afterwards, in the player the contents are read out from the contents storage section 101 in the medium with contents play-back restriction function, then deciphered in the deciphering section 107 and then played back in a play-back section 107.

This modification has a merit that when the term of the back-up by the capacitor 105 has been over, contents copied and stored in a false medium can not be played back because the data necessary for the contents play-back has been vanished.

As has been described in the foregoing, it is a first effect obtainable according to the present invention that, upon lapse of a certain term, the data necessary for the contents play-back vanishes, thus disabling the contents play-back. It is thus possible to organize a rental system, in which contents medium need not be returned.

It is a second obtainable effect that where a timer is used, it is possible to set an accurate term until the vanishing of the data necessary for the contents play-back.

It is a third obtainable effect that since the capacitor is charged when a regular server is confirmed as such, it is possible to prevent unfair extension of the term until vanishment of the data necessary for the contents play-back by a false server.

It is a fourth obtainable effect that once contents have been stored, it is necessary at the data reception time to receive only the data necessary for the contents play-back, thus permitting great reduction of the operation time involved.

It is a fifth obtainable effect that where medium read/write control data is used as the data necessary for the contents play-back, with vanishing of the data after the lapse of a certain term it becomes impossible to read out contents, thus greatly reducing the possibility of the unfair read-out of data.

It is a sixth obtainable effect that it is possible to arrange that a sole timer is backed up by an internal battery (or capacitor) and, when the effective term has been over, a deciphering key stored in the data storage section is deleted as soon as external main power is supplied, thus permitting the capacity of the internal battery or capacitor and the cost to be reduced.

It is a seventh obtainable effect that in the event of unfair accessing to the disk system, substantially simultaneously with the occurrence of the unfair accessing the back-up power supply circuit for the volatile memory is turned off, thereby deleting the play-back data in the volatile memory to prevent unfair use of contents and leakage of the play-back data itself.

It is an eighth obtainable effect that it is possible to a medium read/write section on the side of the server or player, thus permitting simplification of the structure of the medium with contents play-back restriction mechanism and great cost reduction.

It is a ninth obtainable effect that it is possible to receive control data for the medium read/write section in the player from the medium with contents play-back restriction mechanism, thus making it impossible to read out contents in the case other than regular medium with contents play-back restriction mechanism and permitting great reduction of the possibility of unfair contents play-back.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A disk system with contents play-back restriction mechanism comprising:
   a contents storage section storing contents;
   a capacitor charged with power;
   a volatile memory storing data necessary for the play-back of the contents, the data stored in the volatile memory being maintained in response to charge stored on the capacitor; and
   a controller controlling the contents storage section and the volatile memory when supplied with power from a player or a server,
   wherin the player comprises the controller, the content storage section, the capacitor, and the volatile memory.

2. The disk system according to claim 1, wherein the capacitor is charged for a period of time for which the play-back of the contents is allowed, and wherein the capacitor is charged with power from a server.

3. The disk system according to claim 1, wherein charge in the capacitor restricts the playback of the contents by disabling the playback after a predetermined period of time.

4. The disk system with contents play-back restriction mechanism according to claim 1, wherein a server charges the capacitor for a period of time viewing of the stored contents is allowed.

5. The disk system with contents play-back restriction mechanism according to claim 1, wherein a server charges the capacitor for a predetermined time, wherein said predetermined time sets a rental time for the stored contents.

6. A disk system with contents play-back restriction mechanism comprising:
   a contents storage section storing contents received;
   a battery;
   a timer for timing application of battery power to a volatile memory, in which a value corresponding to rental time data of the contents is set;
   a volatile memory powered by the battery in response to the timer, for storing data necessary for the play-back of the contents, whereby the data is deleted from the volatile memory in response to output of the timer; and
   a controller controlling the contents storage section, the timer and the volatile memory when receiving power supplied from a player or the server,
   wherein the player comprises the controller, the content storage section, the capacitor, and the volatile memory.

7. A disk system with contents play-back restriction mechanism comprising:
   a contents storage section storing contents;
   a capacitor;
   a timer for timing application of the charge stored in the capacitor;
   a volatile memory powered by the capacitor in response to the timer, for storing data necessary for the play-back of the contents, whereby the data is deleted from the volatile memory in correspondence to the output of the timer; and
   a controller controlling the contents storage section, the timer and the volatile memory data when receiving power from a player or a server,
   wherein the player comprises the controller, the content storage section, the capacitor, and the volatile memory.

8. The disk system with contents play-back restriction mechanism according to one of claims 1 to 7, wherein the contents stored in the contents storage section have been ciphered and the data necessary for the play-back of the contents comprises a deciphering key for deciphering the contents.

9. The disk system with contents play-back restriction mechanism according to claim 8, further comprising a mechanism having a switch provided on power supply line led to the volatile memory such that, when unauthorized accessing is performed, the switch is turned off to delete data in the volatile memory.

10. The disk system with contents play-back restriction mechanism according to claim 8, wherein the connection of the disk system to the server or the player is confirmed by the outer shape of an interface connected to the server or the player or by the controller.

11. The disk system with contents play-back restriction mechanism according to one of claims 1 to 7, wherein the data necessary for the play-back of the contents comprises data of a procedure of read-out control of the contents storage section.

12. The disk system with contents play-back restriction mechanism according to claim 11, further comprising a mechanism having a switch provided on power supply line led to the volatile memory such that, when unauthorized accessing is performed, the switch is turned off to delete data in the volatile memory.

13. The disk system with contents play-back restriction mechanism according to claim 11, wherein the connection of the disk system to the server or the player is confirmed by the outer shape of an interface connected to the server or the player or by the controller.

14. The disk system with contents play-back restriction mechanism according to one of claims 1 to 7, further comprising a mechanism having a switch provided on power supply line led to the volatile memory such that, when unfair accessing is performed, the switch is turned off to delete data from the volatile memory.

15. The disk system with contents play-back restriction mechanism according to claim 14, wherein the connection of the disk system to the server or the player is confirmed by the outer shape of an interface connected to the server or the player or by the controller.

16. The disk system according to claim 7, wherein the data necessary for the play-back is deleted to disable the play-back of the contents.

17. A disk system with contents play-back restriction mechanism comprising:
   a data storage section storing ciphered contents and a deciphering key for deciphering the contents;
   a battery;
   a timer for timing application of battery power to the data storage section, in which a value corresponding to rental time data of the contents is set; and
   a controller controlling the data storage section and the timer when receiving power supplied from a player or a server, and deleting the deciphering key based on output of the timer,
   wherein the player comprises the controller, the content storage section, the capacitor, and the volatile memory.

18. A disk system with contents play-back restriction mechanism comprising:
   a data storage section storing ciphered contents and a deciphering key for deciphering the contents;
   a capacitor with a charge;

a timer for timing application of the charge stored in the capacitor, in which a value corresponding to rental time data of the contents is set; and a controller controlling the data storage section and the timer, and deleting the deciphering key stored the data storage section based on output of the timer, wherein the player comprises the controler, the content storage section, the capacitor, and the volatile memory.

19. The disk system with contents play-back restriction mechanism according to one of claims 1 to 7 or 17 to 18, wherein the connection of the disk system to the server or the player is confirmed by the outer shape of an interface connected to the server or the player or by the controller.

20. A disk system with contents play-back restriction mechanism comprising:

a contents storage section storing contents;

a reader reading the contents and data necessary for play-back from a volatile memory;

a capacitor with a charge;

a volatile memory storing the data necessary for the play-back of the contents, the data stored in the volatile memory being maintained in response to the charge stored in the capacitor; and a controller controlling the volatile memory when receiving power supplied from a player or a server, wherein the player comprises the controller, the content storage section, the reader, the capacitor, and the volatile memory.

21. The disk system according to claim 20, wherein when the charge in the capacitor expires, the volatile memory is left without power and the deciphering key is thereby deleted from the volatile memory.

22. A medium with contents play-back restriction mechanism comprising:

a content storage area storing contents received from a server;

a reader reading the contents and data necessary for the play-back of the contents;

a battery;

a timer for timing the application of battery power to a volatile memory, in which a value corresponding to rental time data of the contents is set;

a volatile memory storing data necessary for the play-back of the contents, the data stored in the volatile memory is deleted based on output of the timer; and a controller controlling the timer and the volatile memory when receiving power supplied from the player or the server, wherein the player comprises the controller, the content storage section, the capacitor, and the volatile memory.

23. A medium with contents play-back restriction mechanism comprising:

a contents storage section storing contents received from a server;

a reader reading the contents from the content storage section and data necessary for the play-back of the contents from a volatile memory;

a capacitor charged with power from the server, a timer for timing application of the charge stored in the capacitor to a volatile memory, in which a value received from the server and corresponding to rental time data of the contents is set;

a volatile memory storing data necessary for the play-back of the contents, whereby the data is deleted from the volatile memory based on output of the timer; and a controller controlling the timer and the volatile memory when receiving power supplied from the player or the server, wherein the player comprises the controllers, the content storage section, the capacitor, and the volatile memory.

24. The medium with contents play-back restriction mechanism according to one of claims 20 to 23, wherein the contents stored in the contents storage section have been ciphered and the data necessary for the play-back of the contents comprises a deciphering key for deciphering the contents.

25. The disk system with contents play-back restriction mechanism according to claim 24, further comprising a mechanism having a switch provided on power supply line led to the volatile memory such that, when unauthorized accessing is performed, the switch is turned off to delete data in the volatile memory.

26. The disk system with contents play-back restriction mechanism according to claim 24, wherein the connection of the disk system to the server or the player is confirmed by the outer shape of an interface connected to the server or the player or by the controller.

27. The medium with contents play-back restriction mechanism according to one of claims 20 to 23, wherein the data necessary for the play-back of the contents. comprises dataof a procedure of read-out control of the contents storage section.

28. The disk system with contents play-back restriction mechanism according to claim 27, further comprising a mechanism having a switch provided on power supply line led to the volatile memory such that, when unauthorized accessing is performed, the switch is turned off to delete data in the volatile memory.

29. The disk system with contents play-back restriction mechanism according to claim 27, wherein the connection of the disk system to the server or the player is confirmed by the outer shape of an interface connected to the server or the player or by the controller.

30. The disk system with contents play-back restriction mechanism according to one of claims 20 to 23, further comprising a mechanism having a switch provided on a power supply line to the volatile memory such that, when unauthorized accessing is performed, the switch is turned off to delete data in the volatile memory.

31. The disk system with contents play-back restriction mechanism according to claim 30, wherein the connection of the disk system to the server or the player is confirmed by the outer shape of an interface connected to the server or the player or by the controller.

32. The disk system with contents play-back restriction mechanism according to one of claims 20 to 23, wherein the connection of the disk system to the server or the player is confirmed by the outer shape of an interface connected to the server or the player or by the controller.

33. A disk system with contents play-back restriction mechanism comprising:

a data storage section storing ciphered contents and a deciphering key for deciphering the contents;

a reader reading the contents and the key;

a battery;

a timer for timing application of battery power, in which a value corresponding to rental time of the contents is set; and a controller controlling the timer when receiving power supplied from the player or a server, wherein the deciphering key stored in the data storage section is deleted by the reader based on output of the timer, and wherein the player comprises the controller, the data storage section, the battery, and the reader.

34. A disk system with contents play-back restriction mechanism comprising:

a data storage section storing ciphered contents and a deciphering key for deciphering the contents;

a reader reading the contents and the key;

a capacitor;

a timer for timing application of charge stored in the capacitor, in which a value corresponding to rental time data of the contents is set; and a controller controlling the timer when receiving power supplied from the player or a server, wherein the deciphering key stored in the data storage section is deleted by the player based on output of the timer, and wherein the player comprises the controllers, the data storage section, the capacitor, and the reader.

35. A disk system with a restriction mechanism comprising:

a contents storage section storing contents for a playback;

a volatile memory storing data necessary for the playback of the contents; and a restriction mechanism disabling the playback of the contents after a predetermined period of time, wherein the restriction mechanism the content storage section, and the volatile memory are in a player device.

36. The disk system according to claim 35, wherein the restriction mechanism disables the playback of the contents by deleting the necessary data from the volatile memory after the predetermined period of time.

37. The disk system according to claim 36, wherein the restriction mechanism is a capacitor that is charged with a capacity for the predetermined period of time, and wherein the capacitor provides power to the volatile memory and when the capacitor is discharged, the volatile memory receives no power and the data necessary for the playback is deleted.

38. The disk system according to claim 36, wherein the restriction mechanism is a timer that restricts power to the volatile memory after the predetermined period of time, thereby the data necessary for the playback is deleted from the volatile memory.

39. The disk system according to claim 38, wherein the predetermined period of time is a rental time of the data contents.

40. The disk system according to claim 35, wherein the data necessary for the playback is a deciphering key that deciphers the contents stored in the content storage section.

41. The disk system according to claim 35, wherein when the disk system is connected to a server, the restriction mechanism receives a predetermined time for which the playback is allowed, the contents for the playback and the necessary data for the playback.

42. The disk system according to claim 35, further comprising a player that reads the data necessary for the playback from the volatile memory and plays-back the contents stored in the content storage section.

43. The disk system according to claim 42, wherein after a lapse of the predetermined period of time determined by the restriction mechanism, the data necessary for the playback vanishes, and the player cannot play the contents.

44. The disk system according to claim 43, wherein the data necessary for the playback is a control algorithm for reading out the contents stored in the content storage section.

45. The disk system according to claim 35, further comprising a controller controlling the contents storage section and the volatile memory for reading and writing data when supplied with power from the server or the player.

46. A disk system with a restriction mechanism comprising:

a contents storage section storing contents for a playback and data necessary for the playback of the contents;

a restriction mechanism disabling the playback of the contents after a predetermined period of time; and a controller controlling the content storage section and the restriction mechanism, wherein the controller instructs the restriction mechanism to delete the necessary data from the content storage section after the predetermined period of time, wherein the controller, the content storage section and the restriction mechanism are circuits in same device.

* * * * *